(12) United States Patent
Boussaid et al.

(10) Patent No.: US 11,127,128 B2
(45) Date of Patent: Sep. 21, 2021

(54) NON-DESTRUCTIVE EXAMINATION OF AERONAUTICAL PARTS BY AN X-RAY SYSTEM

(71) Applicant: SAFRAN, Paris (FR)

(72) Inventors: Haithem Boussaid, Moissy-Cramayel (FR); Estelle Parra, Moissy-Cramayel (FR)

(73) Assignee: SAFRAN, Paris (FR)

( * ) Notice: Subject to any disclaimer, the term of this patent is extended or adjusted under 35 U.S.C. 154(b) by 94 days.

(21) Appl. No.: 16/494,818

(22) PCT Filed: Mar. 16, 2018

(86) PCT No.: PCT/FR2018/050635
§ 371 (c)(1),
(2) Date: Sep. 17, 2019

(87) PCT Pub. No.: WO2018/172670
PCT Pub. Date: Sep. 27, 2018

(65) Prior Publication Data
US 2020/0082519 A1     Mar. 12, 2020

(30) Foreign Application Priority Data
Mar. 20, 2017   (FR) ...................................... 1752283

(51) Int. Cl.
*G06K 9/00*       (2006.01)
*G06T 7/00*       (2017.01)
(Continued)

(52) U.S. Cl.
CPC ............ *G06T 7/0002* (2013.01); *G01N 23/04* (2013.01); *G06T 7/74* (2017.01); *G06T 2207/10116* (2013.01); *G06T 2207/30168* (2013.01)

(58) Field of Classification Search
CPC .................. G06T 7/0002; G06T 7/74; G06T 2207/10116; G06T 2207/30168; G01N 23/04
(Continued)

(56) References Cited

U.S. PATENT DOCUMENTS

| 6,658,089 B1 | 12/2003 | Mohr et al. |
| 7,734,102 B2 * | 6/2010 | Bergeron ................. G06T 7/70 382/209 |

(Continued)

OTHER PUBLICATIONS

International Search Report dated Jun. 28, 2018 in PCT/FR2018/050635 filed on Mar. 16, 2018.
(Continued)

*Primary Examiner* — Jonathan S Lee
(74) *Attorney, Agent, or Firm* — Oblon, McClelland, Maier & Neustadt, L.L.P.

(57) ABSTRACT

A method for the non-destructive examination of aeronautical parts utilizing a system for acquiring x-ray images of the aeronautical parts, the method including verifying the system for acquiring x-ray images of the aeronautical parts, the verification including the steps of: acquiring an x-ray image of a known reference part including predefined structures, recognizing the predefined structures of the known reference part in the acquired x-ray image, measuring image quality on the basis of the result of the recognition step, wherein the recognition of the predefined structures of the known reference part in the acquired x-ray image includes the steps of: using information extracted from the acquired image in order to produce first structure information, and combining the first structure information with information representing a priori knowledge of the structures, by modelling using a Markov chain, in order to produce second structure information.

10 Claims, 2 Drawing Sheets

(51) Int. Cl.
*G06T 7/73* (2017.01)
*G01N 23/04* (2018.01)

(58) Field of Classification Search
USPC .......................................................... 382/141
See application file for complete search history.

(56) References Cited

U.S. PATENT DOCUMENTS

| | | | |
|---|---|---|---|
| 8,131,107 B2* | 3/2012 | Sun | G06T 7/35 |
| | | | 382/272 |
| 9,152,860 B2* | 10/2015 | Cervin | G06K 9/66 |
| 9,952,340 B2* | 4/2018 | Bas | G01V 1/301 |
| 10,335,091 B2* | 7/2019 | Cole | A61B 5/1038 |
| 10,607,147 B2* | 3/2020 | Raykov | G06Q 50/16 |
| 2011/0200268 A1 | 8/2011 | Chen | |

OTHER PUBLICATIONS

French Preliminary Search Report dated Nov. 30, 2017 in French Application 1752283 filed on Mar. 20, 2017.
Baniukiewicz, P. et al., "Automatic Detection and Identification of Image Quality Indicators in Radiograms," Electromagnetic Nondestructive Evaluation (XIV), 2011, pp. 157-163 (XP009501924).
Sikora R. et al., "Intelligent System for Radiogram Analysis," AIP Conference Proceedings, 2011, pp. 525-532, 9 total pages (XP055429821).

* cited by examiner

NON-DESTRUCTIVE EXAMINATION OF AERONAUTICAL PARTS BY AN X-RAY SYSTEM

TECHNICAL FIELD

The invention relates to the non-destructive examination of aeronautical parts by an X-ray system. Such a system has to be verified periodically in order to guarantee the performance thereof.

The verification of an X-ray system comprises the taking of quality measurements on X-ray images of standardised reference parts called image quality indicators.

PRIOR ART

The operation of an X-ray system used for the non-destructive examination of aeronautical parts is verified periodically, for example once per month. For this, an operator places a reference part in the cabin of the X-ray acquisition system. The reference part, also referred to as a gauge block, is an image quality indicator that meets for example the standard ASTM E1025. The X-ray system produces an X-ray image of the gauge block.

In a known manner, the operator has to make a manual selection in order to define the pixels of the image concerned by the measurement of image quality which depend on the recognition of the reference part in the X-ray image.

The grey level values of the selected pixels are then analysed in order to deduce a measurement of image quality. The measurement of image quality is therefore based on an action of an operator and therefore is not perfectly reproducible.

The measurement of image quality is evaluated in terms of the aging or of the deterioration of the X-ray system. This evaluation has for result a decision as to the aptitude of the X-ray system to be used to provide X-ray images of parts for the purposes of a non-destructive examination of the quality of these parts. It is therefore important to render reproducible the verification of the X-ray system, which is not the case with the known systems due to the intervention of the operator.

DISCLOSURE OF THE INVENTION

The invention aims to resolve the problems of prior art by supplying a method of non-destructive examination of aeronautical parts implementing an acquisition system of X-ray images of aeronautical parts, with the method comprising the verification of the acquisition system of X-ray images of aeronautical parts, with the verification comprising the steps of:
  Acquisition of an X-ray image of a known reference part comprising predefined structures,
  Recognising predefined structures of the known reference part in the acquired X-ray image,
  Measuring the image quality according to the result of the step of recognition,
  Characterised in that the recognition of the predefined structures of the known reference part in the acquired X-ray image comprises steps of:
    Using information extracted from the acquired image, to produce first structure information, and
    Combining the first structure information with information representing a priori knowledge of the structures, by modelling by a Markov chain, in order to produce second structure information.

Thanks to the invention, the measurements of image quality are reproducible and consequently are more reliable than according to prior art. Indeed, there is no action of an operator to select pixels used for the measurement of image quality.

According to a preferred characteristic, the predefined structures of the known reference part comprise at least one hole and the use of information extracted from the acquired image comprises the application of a blob detector to the data representing the acquired image.

According to a preferred characteristic, the predefined structures of the known reference part comprise several holes, and the information representing the a priori knowledge of the structures comprises the distances between the holes.

According to a preferred characteristic, the predefined structures of the known reference part comprise a contour of the known reference part and the use of information extracted from the acquired image comprises the application of a Canny detector to the data representing the acquired image.

According to a preferred characteristic, the use of information extracted from the acquired image further comprises the application of a Hough transformation to the result of the application of the Canny detector.

According to a preferred characteristic, the information representing the a priori knowledge of the structures comprises geometrical relations between portions of the contour of the known reference part.

According to a preferred characteristic, the combining of the first structure information with information representing an a priori knowledge of the structures comprises a maximising of a score that depends on information representing an a priori knowledge of structures.

The invention also relates to a non-destructive examination device of aeronautical parts implementing an acquisition system of X-ray images of aeronautical parts, with the device comprising means for verifying the acquisition system of X-ray images of aeronautical parts, with the means for verifying comprising:
  means for recognising predefined structures of a known reference part in an X-ray image acquired by the acquisition system of X-ray images,
  means for measuring the image quality according to the result of the step of recognition,
  Characterised in that the means for recognising predefined structures of the reference part known in the acquired X-ray image comprise:
  means for using information extracted from the acquired image, to produce first structure information, and
  means for combining the first structure information with information representing an a priori knowledge of the structures, by modelling by a Markov chain, in order to produce second structure information.

The device has advantages similar to those presented hereinabove.

In a particular embodiment, the steps of the method according to the invention are implemented by computer program instructions.

Consequently, the invention also aims a computer program on an information support, with this program being able to be implemented in a computer, this program comprising instructions adapted to the implementation of steps of a method such as described hereinabove.

This program can use any programming language, and be in the form of source code, object code, or intermediate code between source code and object code, such as in a partially compiled form, or in any other desirable form.

The invention also aims for an information support that can be read by a computer, and comprising computer program instructions suitable for implementing the steps of a method such as described hereinabove.

The information support can be any entity or device capable of storing the program. For example, the support can comprise a means of storage, such as a ROM, for example a CD ROM or a ROM of a microelectronic circuit, or a means of magnetic recording, for example a diskette or a hard drive.

On the other hand, the information support can be a support that can be transmitted such as an electrical or optical signal, which can be conveyed via an electrical or optical cable, by radio or by other means. The program according to the invention can in particular be downloaded on a network of the Internet type.

Alternatively, the information support can be an integrated circuit wherein the program is incorporated, with the circuit being adapted to execute or to be used in the execution of the method according to the invention.

BRIEF DESCRIPTION OF THE DRAWINGS

Other characteristics and advantages shall appear when reading the following description of a preferred embodiment, given as a non-limiting example, described in reference to the figures wherein.

DETAILED DISCLOSURE OF PARTICULAR EMBODIMENTS

Figure 1:
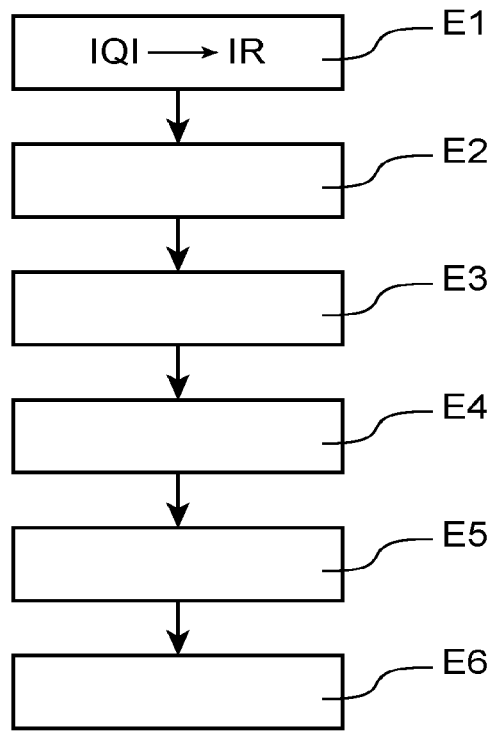
FIG. 1 shows a method of non-destructive examination of aeronautical parts by an acquisition system of X-ray images of aeronautical parts, according to an embodiment of the present invention.

According to a preferred embodiment, shown in FIG. 1, the method of non-destructive examination of aeronautical parts by an acquisition system of X-ray images of aeronautical parts comprises steps E1 to E6.

The method of non-destructive examination of aeronautical parts conventionally comprises the implementing of an acquisition system of X-ray images of aeronautical parts. Interest is given here only to the verification of acquisition system of X-ray images of aeronautical parts. The other aspects of the method of non-destructive examination will not be described.

Figure 2:
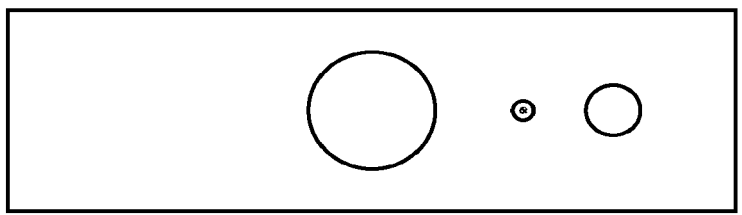
FIG. 2 shows an example of an image quality indicator.

The step E1 is the acquisition of an X-ray image IR of a known reference part which is an image quality indicator IQI. FIG. 2 shows such an indicator, in the form of a gauge block of rectangular section comprising three cylindrical holes of different radii. This image quality indicator is standardised in the standard ASTM E1025. This image quality indicator is characterised by the dimensions of its sides, the position and the diameter of its holes and the distances between the centres of the holes, with a margin of tolerance in relation to the standard. These characteristics constitute predefined structures of the known reference part.

Of course, other image quality indicators with other geometrical characteristics can be used within the framework of the invention.

The X-ray image IR of the image quality indicator IQI is conventionally formed and the taking of the image per se will not be described here.

The step E2 is a use of the data of the X-ray image IR in order to detect the three holes in the image or in a zone of interest of the latter. The three holes are detected one after the other. The detection of a hole is a detection of a circle of radius r in the X-ray image IR and is carried out by the application of a blob detector to the data that represents the X-ray image. This is a Laplacien of Gaussian filter which is a convolution of the image with a core which is the second derivative of a Gaussian. The filter has a single parameter which is the standard deviation $\sigma$ of the Gaussian. This parameter is also considered as the scale factor of the filter. The core of the filter is a function with two variables x and y and is written:

$$G(x,y,\sigma)=(x^2+y^2-2\cdot\sigma^2)\cdot e^{-(x^2+y^2)/2\cdot\sigma^2}$$

where x and y represent coordinates in a two-dimensional space.

The parameter $\sigma$ of the Laplacien of Gaussian filter depends on the radius r of the circle to be detected according to the formula:

$$\sigma=r/\sqrt{2}$$

The response of the Laplacien of Gaussian filter is maximal when the zeros of the Laplacien are aligned with the circle of radius r.

In practice, the radius r of the circle to be detected is not known. In order to detect a circle of unknown radius in the image, the Laplacien of Gaussian filter is applied several times by varying the parameter $\sigma$ and the maximum response of the filter gives the radius r of the hole. However the response of the filter decreases when the standard deviation a increases. In order to retain the same response (scale-invariant), the filter is multiplied by $\sigma^2$, since the Laplacien is the second derivative of a Gaussian.

The blob detector makes it possible to determine for each pixel of the image treated the probabilities that it is the centre of each one of the three holes.

Indeed, the response of the blob detector in relation to the initial X-ray image is a new image of the same dimension as the initial image. For a given hole of a given radius, the value of each pixel in this new image expresses the probability that this pixel is the centre of the hole in question. In order to have the position of the centre of the hole, it is sufficient to search for the position of the pixel that has the greatest response to the filter.

The step E2 has for result three probability maps, each one being relative to a hole, of the same dimension of the image. In each one of these maps the value of a pixel expresses its probability of being the centre of the hole in question. By searching the maximum of each map, the centre of each one of the three holes is found.

The following step E3 is a combination of the result of the step E2 with information that represents a priori knowledge of the image quality indicator IQI, in such a way as to render the result of the step E2 more robust.

The a priori knowledge of the image quality indicator is a set of information on the geometrical configuration of the image quality indicator. This set of information comprises in particular the distances and the alignment between the centres of the three holes, with a margin of tolerance defined in the standard ASTM E1025.

Two respective centres of two given holes, of respective position $x_1$ and $x_2$, have a nominal distanced $\bar{d}$ and a margin of tolerance a of the actual distance in relation to the nominal distance, with the distance $\bar{d}$ and the margin a being specified in the standard ASTM E1025. The deviation of the actual distance between the two centres in relation to the nominal distance is measured by the following Gaussian-shaped function:

$$\Psi_{1,2}(x_1, x_2) = \exp\left(\frac{(|x_1 - x_2| - \bar{d})^2}{\sigma}\right)$$

If the value of this function is zero, then this means that the actual distance between the two centres of the two holes considered is equal to $\bar{d}$. The higher the value of this function is, the more the distance between the two centres of the two holes considered is different from the nominal value defined by the standard ASTM E1025.

The result of the step E2 and the a priori knowledge of the distances between the centres of the three holes and of their alignment are combined by a Markov chain.

For this, consideration is given to three holes defined by their respective centre $x_1$, $x_2$ and $x_3$ and a random vector $X = \{x_1, x_2, x_3\}$ that represents a configuration of the arrangement of the three holes.

Figure 3:
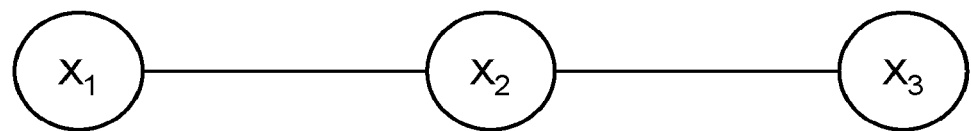
FIG. 3 shows a modelling of a detection problem of three holes of the image quality indicator, by a Markov chain, according to an embodiment of the present invention.

FIG. 3 represents a Markov chain, wherein the nodes represent the centres of the holes to be detected and the edges between the nodes represent the distance constraint between the centres of the holes.

The purpose is to find the realisation of the vector X that maximises the probability that it represents the centres of the three holes.

For this, Bayes' theorem makes it possible to express the a posteriori probability of the vector X knowing the image noted as I:

$$P(X|I) = P(I|X)P(X)$$

Where $P(X)$ represents the a priori probability of the vector X and $P(I|X)$ represents the a posteriori probability of I knowing X.

Then the fact that the vector X is expressed by a Markov chain is used:

$$P(X|I) = P(I|x_1)P(I|x_2)P(I|x_3)P(x_1,x_2)P(x_2,x_3)$$

Each one of the probabilities of the preceding expression is modelled by a respective potential function. As these functions are not necessarily between 0 and 1, a standardisation constant Z is applied. The preceding expression thus becomes:

$$P(X|I) = \frac{1}{Z}\Phi_1(I|x_1)\Phi_2(I|x_2)\Phi_3(I|x_3)\Psi_{1,2}(x_1, x_2)\Psi_{2,3}(x_2, x_3)$$

In this expression, the functions $\Phi_1$, $\Phi_2$, $\Phi_3$ are the respective responses for each hole of the filtering, corresponding to a radius of the hole (step E1). The function $\psi_{1,2}$ was presented hereinabove and the function $\psi_{2,3}$ takes into account the nominal distance between the centres $x_2$ and $x_3$ and the direction of the centres $x_1$ and $x_2$. This function is:

$$\Psi_{2,3} = \exp\left(\frac{(|h_2 - h_3| - \bar{h}_1)^2}{\sigma_1} + \frac{(|v_2 - v_3| - \bar{v}_1)^2}{\sigma_2}\right)$$

Where $(h_2, v_2)$ and $(h_3, v_3)$ are the coordinates of the centres $x_2$ and $x_3$, $\sigma_1$ and $\sigma_2$ are margins of tolerance and $(\bar{h}_1, \bar{v}_1)$ is a vector which the norm is the nominal distance between the centre $x_2$ and $x_3$.

In order to maximise the probability that the vector X represents the centres of the three holes, a score equal to $\log(P(X|I))$ is defined, based on the position of the centres of the holes and on the distance and the alignment of holes. The maximisation of this score provides the position of the centres of the holes.

The maximisation of the score is carried out by a optimiser based on dynamic programming. This optimiser has the guarantee of converging towards the global optimum and does not require initialisation. The dynamic programming is based on the use of the structure of the problem for the breaking down thereof into sub-problems that are easier to solve. The maximisation of the score is carried out recursively. A sub-problem is the searching for the position of the centre of one of the holes. In the example described, there are therefore three sub-problems.

Each sub-problem is a maximisation of a "partial" score according to the position of the centre of one of the holes. The solution of a first sub-problem is used in the resolution of a second sub-problem, of which the resolution is itself used in the resolution of the third sub-problem. The final result is the resolution of the problem, namely the position of the centres of the three holes that maximises the score defined by the Markov chain.

The result of the step E3 is a precise position of the centres of the three holes in the X-ray image.

The same mechanism is applied in order to detect other characteristics of the image quality indicator. The step E3 is followed by the step E4 which is a use of the data of the X-ray image IR in order to detect the contour of the image quality indicator IQI in the X-ray image IR.

The detecting of the contour of the image quality indicator is the detecting of a rectangle of known dimensions in the X-ray image.

A Canny detector is applied to the image in order to detect the main protruding contours thereof.

Note that the Canny filter used is not necessarily optimised. The Canny filtering thus comprises a Gaussian filtering of which the standard deviation is chosen equal to 1% of the width of the image quality indicator. The Canny filtering also comprises a hysteresis thresholding of the contours. The two thresholds are chosen in order to retain only a maximum predefined percentage of the pixels of the image considered as belonging to the contour.

The result of the Canny filtering is a binary image of which the two possible values of pixels are attributed on the one hand to the pixels that belong to the contour and on the other hand to the pixels that do not belong to the contour.

A Hough transformation is applied to the binary image, in such a way as to form a Hough accumulator.

The Hough space is a two-dimensional space where each straight line is represented by its coordinates $(\rho, \theta)$, where $\rho$ represents the distance of the straight line at the centre of the image, and $\theta$ the angle formed by a perpendicular to this straight line with the axis of the abscissa of the image.

Each non-zero pixel of the binary image, i.e. belonging to the contour of the image quality indicator, votes for all of the straight lines passing through this point. The result is an accumulation of votes on each coordinate of the Hough space.

The image quality indicator forms a rectangle in the binary image, therefore four segments of straight lines parallel two-by-two and perpendicular two-by-two. These four segments of straight lines are represented by four points in the Hough space. The rules of correspondence between binary image and Hough space are as follows. Two parallel straight lines are represented by points of the same abscissa in the Hough space. The difference of the ordinates of two points of the Hough space representing parallel straight lines is the distance between these straight lines. Two perpendicular straight lines are represented by points of abscissa different from π/2 in the Hough space.

The maximum values of votes form vertices on the Hough accumulator and represent the longest straight lines detected in the binary image. These vertices form the candidate straight lines to form the contour rectangle of the image quality indicator.

If two vertices have the same abscissa, this means that the straight lines represented by these two vertices are parallel. If two vertices on the accumulator have a difference in abscissa of absolute value of 90°, this means that the straight lines represented by these two vertices are perpendicular.

In practice, the rectangle sought in the image does not necessarily respect these constraints literally. This is due on the one hand to the discrete space (sampling) of the Hough space and on the other hand to the flexibility authorised with respect to the geometrical properties of the image quality indicator. It is then suitable to take account of a certain tolerance with respect to these constraints. The four points sought on the accumulator must have the same abscissa— within a certain tolerance—two-by-two and the first two points must have a difference of 90°—within a certain tolerance—with respect to the last two.

More precisely, this entails searching for four points $\{X_1, X_2, X_3, X_4\}$ on the Hough accumulator. Each point $X_1$ is represented by its coordinates $(\rho_1, \theta_1)$ in the Hough space. In order for these points to represent a rectangle, the following must be true:

$\theta_1 = \theta_2$ $\theta_3 = \theta_4$ $|\theta_2 - \theta_3| = \pi/2$

The step E4 is followed by the step E5 in which the result of the step E4 is combined with information that represents an a priori knowledge of the image quality indicator, in such a way as to make the result of the step E4 more robust.

The constraints hereinabove are verified for any rectangle that can be detected in the image. The search is limited here to the rectangle that encompasses the image quality indicator. The width W and the length L of this rectangle are known in advance within a certain tolerance. These values are found on the Hough accumulator. The width W of the image quality indicator is the absolute value of the difference of the ordinates $\rho_1$ and $\rho_2$ of the first two points that represent the rectangle on the Hough accumulator. The length L of the image quality indicator is the absolute value of the difference of the ordinates $\rho_3$ and $\rho_4$ of the last two points. This translates into the following equations:

$|\rho_1 - \rho_2| = W$ $|\rho_3 - \rho_4| = L$

In order to solve these equations, the problem of searching for four points on the Hough accumulator is modelled by a Markov chain. The chain comprises four nodes which are the four points sought. The liaisons between the nodes represent the geometrical constraints on the coordinates of the points.

The problem of searching for four points on the Hough accumulator is then resolved by the maximisation of a score:

$$S(X_1, X_2, X_3, X_4) = \sum_{i=1}^{4} U(X_i) + \sum_{i=1}^{3} P_{i,i+1}(X_i, X_{i+1})$$

The function with one variable $U(X_1)$ is the Hough accumulator. Searching for points that have maximum scores on the Hough accumulator guarantees that the points represent straight lines detected by the Canny detector.

The functions with two variables correspond to geometrical constraints between the four points sought. These functions represent a penalty that increases by moving away from a nominal displacement between the two variables of the function. More precisely, there is:

$$P_{1,2}(X_1, X_2) = -\frac{(|\theta_1 - \theta_2|)^2}{\sigma_1} - \frac{(|\rho_1 - \rho_2| - W)^2}{\sigma_2}$$

Where $X_1$ and $X_2$ are the points on the Hough accumulator that represent the two straight lines of the rectangle which are parallel and of which the distance between the two is equal to W. The function is zero for each pair of points that satisfies this property and becomes increasingly negative the more the points move away from this configuration.

In the function $$P_{2,3}(X_2, X_3) = -\frac{(|\theta_2 - \theta_3| - \pi/2)^2}{\sigma_3},$$

$X_3$ is the point on the Hough accumulator that represents the straight line of the rectangle which is perpendicular to the straight line of the rectangle represented by the point $X_2$.

The last function is written:

$$P_{3,4}(X_3, X_4) = -\frac{(|\theta_3 - \theta_4|)^2}{\sigma_3} - \frac{(|\rho_3 - \rho_4| - L)^2}{\sigma_4}$$

Where $X_3$ and $X_4$ are the points on the Hough accumulator which represent the two straight lines of the rectangle which are parallel and of which the distance between the two is equal to L.

In each one of the three preceding functions, the terms $\sigma_1$, $\sigma_2$, $\sigma_3$ and $\sigma_4$ are tolerances in the search for the rectangle of width W and of length L.

An inference/optimisation algorithm is then applied in order to maximise the score function, i.e. to find the values $\{X_1^*, X_2^*, X_3^*, X_4^*\}$ such that:

$$\{X_1^*, X_2^*, X_3^*, X_4^*\} = \underset{X_1, X_2, X_3, X_4}{\arg\max} \, S(X_1, X_2, X_3, X_4)$$

This problem is presented as a discrete Markov field of which the structure is a chain, and is resolved by the dynamic programming algorithm. This algorithm provides as output the coordinates of the four points that maximise (global maximum) the score function.

The four points provide the polar equations of the four corresponding straight lines in the image of the image quality indicator. The coordinates of the four vertices of the rectangle are then calculated by calculating the intersections between the four straight lines.

The result of the step E5 is then the contour of the image quality indicator in the X-ray image.

The following step E6 is a measurement of image quality taken on the X-ray image using the recognition of the image quality indicator in the image. The measurement of image quality is conventional per se and shall not be described here.

Figure 4:
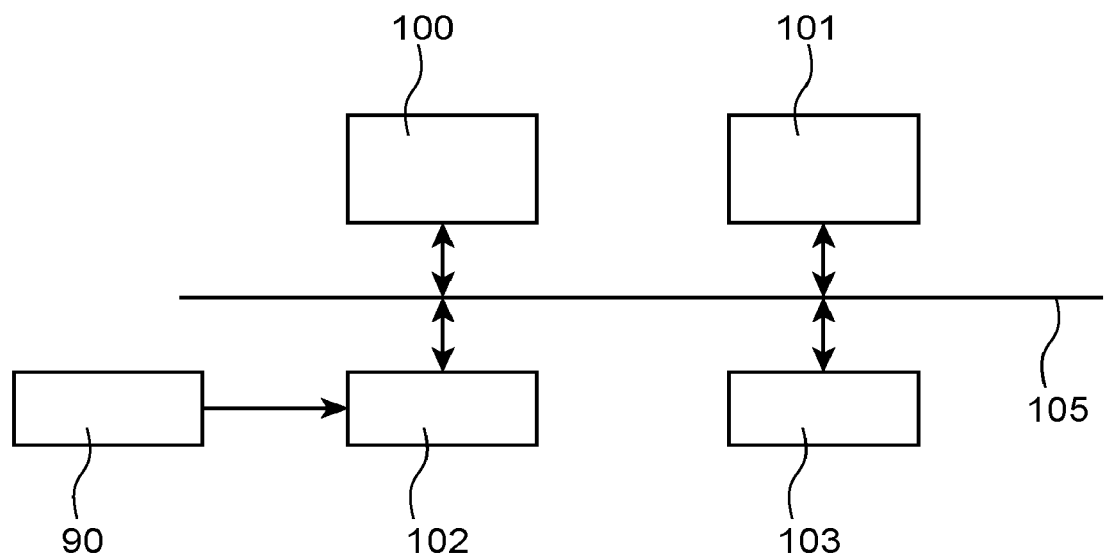
FIG. 4 shows an embodiment of the non-destructive examination device of aeronautical parts by an acquisition system of X-ray images of aeronautical parts, according to an embodiment of the present invention.

FIG. 4 shows a particular embodiment of the non-destructive examination device of aeronautical parts by an acquisition system of X-ray images of aeronautical parts, according to an embodiment.

The device comprises a system 90 for the acquisition of X-ray images of aeronautical parts known per se, which is not described here. It further comprises a means for verifying the acquisition system of X-ray images of aeronautical parts. This means has the general structure of a computer. It comprises in particular a processor 100 executing a computer program implementing the method according to the invention, a memory 101, an input interface 102 and an output interface 103.

These various elements are conventionally connected by a bus 105.

The input interface 102 is connected to the X-ray image acquisition system 90 and is intended to receive the data representing the X-ray image of the image quality indicator to be processed.

The processor 100 executes the processing mentioned hereinabove. This processing is carried out in the form of code instructions of the computer program which are stored by the memory 101 before being executed by the processor 100.

The output interface 103 delivers data that represents the result of the measurement of the image quality.

The invention claimed is:

1. A method for non-destructive examination of aeronautical parts implementing an acquisition system of X-ray images of aeronautical parts, with the method comprising the verification of the acquisition system of X-ray images of aeronautical parts, with the verification comprising the steps of:
　acquiring an X-ray image of a known reference part comprising predefined structures,
　recognizing predefined structures of the known reference part in the acquired X-ray image,
　measuring the image quality according to the result of the step of recognition,
　wherein the recognition of the predefined structures of the known reference part in the acquired X-ray image comprises steps of:
　using information extracted from the acquired image, to produce first structure information, and
　combining the first structure information with information representing a priori knowledge of the structures, by modelling by a Markov chain, in order to produce second structure information.

2. The method for non-destructive examination according to claim 1, with the predefined structures of the known reference part comprising at least one hole, wherein the use of information extracted from the acquired image comprises the application of a blob detector to the data representing the acquired image.

3. The method for non-destructive examination according to claim 2, with the predefined structures of the known reference part comprising several holes, wherein the information representing the a priori knowledge of the structures comprises the distances between the holes.

4. The method for non-destructive examination according to claim 1, with the predefined structures of the known reference part comprising a contour of known reference part, wherein the use of information extracted from the acquired image comprises the application of a Canny detector to the data representing the acquired image.

5. The method for non-destructive examination according to claim 4, wherein the use of information extracted from the acquired image further comprises the application of a Hough transformation to the result of the application of the Canny detector.

6. The method for non-destructive examination according to claim 4, wherein the information representing the a priori knowledge of the structures comprises geometrical relations between portions of the contour of the known reference part.

7. The method for non-destructive examination according to claim 1, wherein the combining of the first structure information with information representing an a priori knowledge of the structures comprises a maximizing of a score that depends on information representing an a priori knowledge of structures.

8. A device for non-destructive examination of aeronautical parts implementing an acquisition system of X-ray images of aeronautical parts, with the device comprising means for verifying the acquisition system of X-ray images of aeronautical parts, with the means for verifying comprising:
　means for recognizing predefined structures of a known reference part in an X-ray image acquired by the acquisition system of X-ray images,
　means for measuring the image quality according to the result of the step of recognition,
　wherein the means for recognising predefined structures of the known reference part in the acquired X-ray image comprising:
　means for using information extracted from the acquired image, to produce first structure information, and
　means for combining the first structure information with information representing an a priori knowledge of the structures, by modelling by a Markov chain, in order to produce second structure information.

9. A non-transitory computer-readable medium comprising instructions for the execution of the steps of the method according to claim 1, when said program is executed by a computer.

10. A non-transitory recording support that can be read by a computer whereon is recorded a computer program comprising instructions for the execution by the computer of the steps of the method according to claim 1.

* * * * *

UNITED STATES PATENT AND TRADEMARK OFFICE
CERTIFICATE OF CORRECTION

PATENT NO. : 11,127,128 B2
APPLICATION NO. : 16/494818
DATED : September 21, 2021
INVENTOR(S) : Boussaid et al.

It is certified that error appears in the above-identified patent and that said Letters Patent is hereby corrected as shown below:

In the Specification

In Column 5, Line 2, delete "distanced" and insert -- distance --, therefor.

In Column 5, Line 17, delete "to $\bar{d}$." and insert -- to $\bar{d}$. --, therefor.

Signed and Sealed this
Nineteenth Day of April, 2022

Katherine Kelly Vidal
*Director of the United States Patent and Trademark Office*